(12) United States Patent
Rajpara

(10) Patent No.: US 11,288,450 B2
(45) Date of Patent: *Mar. 29, 2022

(54) TECHNOLOGY PLATFORM FOR DATA DISCOVERY

(71) Applicant: Casepoint LLC, Tysons, VA (US)

(72) Inventor: Vishalkumar Rajpara, Ashburn, VA (US)

(73) Assignee: Casepoint LLC, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/987,253

(22) Filed: Aug. 6, 2020

(65) Prior Publication Data

US 2020/0364401 A1 Nov. 19, 2020

Related U.S. Application Data

(63) Continuation of application No. 15/432,017, filed on Feb. 14, 2017, now Pat. No. 10,740,557.

(51) Int. Cl.
*G06F 40/247* (2020.01)
*G06K 9/00* (2022.01)
*G06F 16/93* (2019.01)
*G06F 16/35* (2019.01)
*G06F 16/33* (2019.01)
*G06F 40/30* (2020.01)
*G06F 40/295* (2020.01)

(52) U.S. Cl.
CPC ........ *G06F 40/247* (2020.01); *G06F 16/3344* (2019.01); *G06F 16/353* (2019.01); *G06F 16/93* (2019.01); *G06F 40/295* (2020.01); *G06F 40/30* (2020.01); *G06K 9/00456* (2013.01)

(58) Field of Classification Search
CPC .......... G06F 17/2795; G06F 17/30707; G06F 17/30684; G06F 17/30011; G06F 17/278; G06F 17/2785; G06K 9/00456
USPC .......................................................... 704/9
See application file for complete search history.

(56) References Cited

U.S. PATENT DOCUMENTS

| | | | |
|---|---|---|---|
| 6,081,518 A | 6/2000 | Bowman-Amuah | |
| 6,233,575 B1 | 5/2001 | Agarwal et al. | |
| 6,430,547 B1 | 8/2002 | Busche et al. | |
| 6,564,209 B1 | 5/2003 | Dempski et al. | |
| 6,915,295 B2 | 7/2005 | Okamoto et al. | |
| 7,107,284 B1 | 9/2006 | Betz et al. | |
| 7,289,911 B1 | 10/2007 | Rigney | |

(Continued)

OTHER PUBLICATIONS

T. R. Lee, B. M. Goo, H. Kim and S. U. Shin, "Efficient e-Discovery Process Utilizing Combination Method of Machine Learning Algorithms," 2011 Seventh International Conference on Computational Intelligence and Security, 2011, pp. 1109-1113, doi: 10.1109/CIS.2011.246. (Year: 2011).*

(Continued)

*Primary Examiner* — Bharatkumar S Shah
(74) *Attorney, Agent, or Firm* — IP Spring

(57) ABSTRACT

A method includes receiving a set of documents related to data discovery issues, wherein at least a first data discovery issue is unrelated to a second data discovery issue. The method further includes generating a map of terms and words for the set of documents that correspond to concepts. The method further includes providing a user interface that includes a search analytics tool to a user associated with the first data discovery issue.

20 Claims, 11 Drawing Sheets

(56) References Cited

U.S. PATENT DOCUMENTS

| | | |
|---|---|---|
| 7,330,850 B1 | 2/2008 | Seibel et al. |
| 7,558,778 B2 | 7/2009 | Carus et al. |
| 7,761,591 B2 | 7/2010 | Graham |
| 7,912,701 B1 | 3/2011 | Gray et al. |
| 7,921,068 B2 | 4/2011 | Guyon et al. |
| 7,930,197 B2 | 4/2011 | Ozzie et al. |
| 7,945,600 B1 | 5/2011 | Thomas et al. |
| 8,165,974 B2 | 4/2012 | Privault et al. |
| 8,396,838 B2 | 3/2013 | Brockway et al. |
| 8,407,165 B2 | 3/2013 | Monroe et al. |
| 8,504,489 B2 | 8/2013 | Richards et al. |
| 8,554,542 B2 | 10/2013 | Sandor et al. |
| 8,612,446 B2 | 12/2013 | Knight et al. |
| 8,630,975 B1 | 1/2014 | Guo et al. |
| 8,676,722 B2 | 3/2014 | Sweeney et al. |
| 8,838,606 B1 | 9/2014 | Cormack et al. |
| 8,880,492 B2 | 11/2014 | Kumar et al. |
| 8,924,395 B2 | 12/2014 | Wade et al. |
| 8,930,178 B2 | 1/2015 | Pestian et al. |
| 9,043,356 B2 | 5/2015 | Bao et al. |
| 9,058,327 B1 | 6/2015 | Lehrman et al. |
| 9,122,679 B1 | 9/2015 | Yu et al. |
| 9,135,266 B1 | 9/2015 | Makin |
| 9,201,927 B1 | 12/2015 | Zhang |
| 9,208,219 B2 | 12/2015 | Sperling et al. |
| 9,251,208 B2 | 2/2016 | Deng et al. |
| 9,275,129 B2 | 3/2016 | Desai et al. |
| 9,449,080 B1 | 9/2016 | Zhang |
| 9,542,476 B1 | 1/2017 | Allon et al. |
| 9,910,899 B1 | 3/2018 | Fields et al. |
| 10,025,774 B2 | 7/2018 | Coulet et al. |
| 10,235,358 B2 | 3/2019 | Tur et al. |
| 10,257,678 B2 | 4/2019 | Hoseinitabatabaei et al. |
| 10,504,037 B1 | 12/2019 | Anant et al. |
| 10,740,557 B1 | 8/2020 | Rajpara |
| 2002/0022956 A1 | 2/2002 | Ukrainczyk et al. |
| 2002/0169652 A1 | 11/2002 | Busche |
| 2002/0188507 A1 | 12/2002 | Busche |
| 2002/0194159 A1 | 12/2002 | Kamath et al. |
| 2003/0061228 A1 | 3/2003 | Kamath et al. |
| 2003/0083922 A1 | 5/2003 | Reed |
| 2003/0115188 A1 | 6/2003 | Srinivasa et al. |
| 2003/0115189 A1 | 6/2003 | Srinivasa et al. |
| 2003/0204508 A1 | 10/2003 | Cantu-Paz et al. |
| 2004/0064351 A1 | 4/2004 | Mikurak |
| 2004/0260876 A1 | 12/2004 | Singh et al. |
| 2005/0125440 A1 | 6/2005 | Hirst |
| 2005/0262063 A1 | 11/2005 | Conboy et al. |
| 2006/0074980 A1 | 4/2006 | Sarkar |
| 2006/0085750 A1 | 4/2006 | Easton, Jr. et al. |
| 2006/0224442 A1 | 10/2006 | Round et al. |
| 2006/0242180 A1 | 10/2006 | Graf et al. |
| 2006/0265398 A1 | 11/2006 | Kaufman |
| 2007/0156732 A1 | 7/2007 | Surendran et al. |
| 2007/0179959 A1 | 8/2007 | Sharma et al. |
| 2007/0198459 A1 | 8/2007 | Boone et al. |
| 2008/0104052 A1 | 5/2008 | Ryan et al. |
| 2008/0109454 A1 | 5/2008 | Willse et al. |
| 2008/0250013 A1 | 10/2008 | Gruskin et al. |
| 2008/0301174 A1 | 12/2008 | Mons et al. |
| 2009/0012842 A1 | 1/2009 | Srinivasan et al. |
| 2009/0048990 A1 | 2/2009 | Gross |
| 2009/0150906 A1 | 6/2009 | Schmidt et al. |
| 2009/0217179 A1 | 8/2009 | Mons et al. |
| 2009/0240729 A1 | 9/2009 | Van Zwol et al. |
| 2009/0254572 A1 | 10/2009 | Redlich et al. |
| 2010/0030768 A1 | 2/2010 | Poblete et al. |
| 2010/0070448 A1 | 3/2010 | Omoigui |
| 2010/0114561 A1 | 5/2010 | Yasin |
| 2010/0174675 A1 | 7/2010 | Mons et al. |
| 2010/0250541 A1 | 9/2010 | Richards et al. |
| 2010/0324936 A1 | 12/2010 | Vishnubhatla et al. |
| 2011/0029526 A1 | 2/2011 | Knight et al. |
| 2011/0047166 A1 | 2/2011 | Stading et al. |
| 2011/0173033 A1 | 7/2011 | Paknad et al. |
| 2011/0202555 A1 | 8/2011 | Cordover et al. |
| 2011/0302171 A1 | 12/2011 | Waldo et al. |
| 2012/0209853 A1 | 8/2012 | Desai et al. |
| 2012/0265762 A1* | 10/2012 | Wade ................ G06F 16/22 707/741 |
| 2012/0278321 A1 | 11/2012 | Traub et al. |
| 2012/0296891 A1 | 11/2012 | Rangan |
| 2013/0013996 A1* | 1/2013 | Wu .................... G06F 16/93 715/227 |
| 2013/0031474 A1 | 1/2013 | McMahon |
| 2013/0041857 A1 | 2/2013 | Medlock et al. |
| 2013/0144878 A1 | 6/2013 | James et al. |
| 2013/0185112 A1 | 7/2013 | Friedlander et al. |
| 2014/0095201 A1 | 4/2014 | Farooq et al. |
| 2014/0214895 A1 | 7/2014 | Higgins et al. |
| 2014/0222928 A1 | 8/2014 | Scholtes et al. |
| 2014/0244524 A1* | 8/2014 | Brestoff ............. G06Q 10/06 705/311 |
| 2014/0278816 A1 | 9/2014 | Sharp et al. |
| 2014/0279588 A1 | 9/2014 | Fitzgerald et al. |
| 2015/0066964 A1 | 3/2015 | Makino et al. |
| 2015/0073918 A1 | 3/2015 | Aronson et al. |
| 2015/0081278 A1* | 3/2015 | Unno ................. G06F 40/274 704/9 |
| 2015/0098660 A1 | 4/2015 | Ravid et al. |
| 2015/0236934 A1 | 8/2015 | Huang et al. |
| 2015/0281292 A1 | 10/2015 | Murayama et al. |
| 2015/0317339 A1 | 11/2015 | Vranyes et al. |
| 2016/0299955 A1* | 10/2016 | Jain ................... G06F 16/313 |
| 2016/0371591 A1 | 12/2016 | Reddy et al. |
| 2017/0262614 A1 | 9/2017 | Vishnubhatla et al. |
| 2017/0359385 A1 | 12/2017 | Barday |
| 2018/0032606 A1 | 2/2018 | Tolman et al. |
| 2018/0137419 A1 | 5/2018 | Byron et al. |
| 2018/0173795 A1 | 6/2018 | Cobbett et al. |
| 2018/0239959 A1 | 8/2018 | Bui et al. |
| 2018/0308569 A1 | 10/2018 | Luellen |
| 2019/0332917 A1 | 10/2019 | Qian |
| 2020/0226646 A1 | 7/2020 | Awoyemi et al. |
| 2020/0311304 A1 | 10/2020 | Parthasarathy |
| 2020/0350072 A1 | 11/2020 | McEwing et al. |

OTHER PUBLICATIONS

T. R. Lee, B. M. Goo, H. Kim and S. U. Shin, "Efficient e-Discovery Process Utilizing Combination Method of Machine Learning Algorithms," 2011 Seventh International Conference on Computational Intelligence and Security, 2011, pp. 1109-1113, doi: 10.1109/CIS. 2011.246. (Year: 2011) (Year: 2011).*

USPTO, Final Office Action for U.S. Appl. No. 15/666,437, dated Apr. 2, 2020, 20 pages.

USPTO, Non-final Office Action for U.S. Appl. No. 15/666,437, dated Aug. 21, 2019, 31 pages.

USPTO, Non-final Office Action for U.S. Appl. No. 15/432,017, dated Aug. 13, 2019, 16 pages.

USPTO, Final Office Action for U.S. Appl. No. 15/432,017, dated Jan. 28, 2020, 16 pages.

USPTO, Notice of Allowance for U.S. Appl. No. 15/432,017, dated Jun. 19, 2020, 11 pages.

USPTO, Non-final Office Action for U.S. Appl. No. 15/666,430, dated Mar. 19, 2020, 25 pages.

USPTO, Final Office Action for U.S. Appl. No. 15/432,017, dated Mar. 20, 2019, 20 pages.

USPTO, Non-final Office Action for U.S. Appl. No. 15/432,017, dated Oct. 4, 2018, 18 pages.

Bengio, et al., "Introduction to the special issue on neural networks for data mining and knowledge discovery", In IEEE Transactions on Neural Networks, vol. 11, No. 3, May 2000, pp. 545-549.

Chen, "Automatic construction of networks of concepts characterizing document databases", In IEEE Transactions on Systems, Man, and Cybernetics, vol. 22, No. 5, Sep.-Oct. 1992, pp. 885-902.

Clifton, et al., "TopCat: data mining for topic identification in a text corpus", In IEEE Transactions on Knowledge and Data Engineering, vol. 16, No. 8, Aug. 2004, pp. 949-964.

(56) References Cited

OTHER PUBLICATIONS

Glushko, et al., "Analyzing Document Components", In Document Engineering: Analyzing and Designing Documents for Business Informatics and Web Services; MIT Press, 2008, pp. 373-417.
USPTO, Non-final Office Action for U.S. Appl. No. 15/666,437, dated Dec. 28, 2020, 32 pages.
USPTO, Final Office Action for U.S. Appl. No. 15/666,437, dated Aug. 3, 2021, 24 pages.
USPTO, Notice of Allowance for U.S. Appl. No. 15/666,437, dated Nov. 15, 2021, 13 pages.

* cited by examiner

CaseAssist Search Results Summary

- 15201 Documents Found
- 55 GB Total Document Size
- 09/01/2005 Last Modification Date
- 1002 Similar Documents Found

FIG 7

CaseAssist Search Results

Money

▼Email
  ▼All emails
    ▼rosalee flemming (326)
       fraud (1)
       talking points (5)
    ▼rapp (55)
       bankrupt (2)
    ▼karen.denne@email.com (25)
    ▼rosalee.fleming@email.com (199)
    ▼savont@email.abc.com (38)
    ▼mike@way-abc.com (3)
       bankrupt (3)
  ▷Date
  ▷Documents
  ▷Similar documents ☐ [Credit Risk Control at UBSW Energy LLC]
REV0000043
Ubswe.ppt
...practices Monitor, measure and report counterparty risk Business Responsibilities KYC Money Laundering Suitability aUBS Warburg Credit Risk Controls Credit approval of...
.ppt | 02/04/2002

☐ REV0000101
Quality meeting to utilize on your next date.msg
...It may be possible to obtain additional advice if you create motivations such as additional money.
.msg | 11/15/2001

☐ REV0000142
Bids Open for Enron Trading Unit.msg
...100 million in retention payments upset those entitled to more money under Enron's severance policy, they said. The company's...
.msg | 12/20/2001

☐ [Electric Power Daily]
REV0000171
Enron Elves Update.msg
...tickets in the lower level, parking included. If you donated money or a fit and were not able to enter your...
.msg | 01/03/2002

FIG 8

CaseAssist Quick Review

RV0000003 – Re: This is subject to energy cost and money
.msg 01/10/2016
Category: [Finance]

Document Summary:
From 1998 to 2000, Enron's gross revenues rose from $31 billion to more than $100 billion. The financial press, however, began to ask questions about Enron's finances. "How exactly did Enron make its money?" asked Bethany McLean, a reporter for Fortune magazine who was the first to question Enron's finances in March 2001 (Gibney, 2005).

After September 11, 2001, the Securities Exchange Commission launched an investigation into Enron. Employees and shareholders were kept in the dark about the company's finances. While corporate leaders assured employees that there were no accounting irregularities, they quietly sold their stock in the preceding months before the bankruptcy occurred in December 2001. Enron CEO Jeff Skilling unloaded his stock while encouraging employees to keep their shares. Meanwhile, 20,000 Enron employees lost jobs and health insurance. Everything they had worked for was gone when $2 billion in pensions disappeared. Accounting firm Arthur Anderson was convicted of obstructing justice, and 29,000 people at the firm lost their jobs. Lives that were valued at millions were reduced to $20,000. In the wake of the Enron and other corporate accounting scandals, the Sarbanes-Oxley Act was passed in 2002. However, Enron should not be viewed as an aberration, but as something that can happen again (Gibney, 2005).

Case Tags: [Responsive] [Non-Responsive] [Privilege]

Assist Tags: [Relevance] [Non-Relevance]

```
┌─────────────────────────────────────────────────────────────┐
│ Receive a set of documents related to electronic discovery  │
│ issues, where at least a first electronic discovery issue   │
│ is unrelated to a second electronic discovery issue 1002    │
└─────────────────────────────────────────────────────────────┘
                              │
                              ▼
┌─────────────────────────────────────────────────────────────┐
│ Generate a map of terms and words for the set of documents  │
│ that correspond to concepts 1004                            │
└─────────────────────────────────────────────────────────────┘
                              │
                              ▼
┌─────────────────────────────────────────────────────────────┐
│ Provide a user interface that includes a search analytics   │
│ tool to a user associated with the first electronic         │
│ discovery issue 1006                                        │
└─────────────────────────────────────────────────────────────┘
```

```
┌─────────────────────────────────────────────────────────────┐
│ Receive a first set of documents related to electronic      │
│ discovery issues, where the first set of documents is       │
│ associated with a first electronic discovery issue  1102    │
└─────────────────────────────────────────────────────────────┘
                              │
                              ▼
┌─────────────────────────────────────────────────────────────┐
│ Generate a map of terms and words for the fist set of       │
│ documents that correspond to concepts  1104                 │
└─────────────────────────────────────────────────────────────┘
                              │
                              ▼
┌─────────────────────────────────────────────────────────────┐
│ Receive, from a user, a second set of documents that is     │
│ associated with a second electronic discovery issue, where  │
│ the first electronic discovery issue is unrelated to the    │
│ second electronic discovery issue  1106                     │
└─────────────────────────────────────────────────────────────┘
                              │
                              ▼
┌─────────────────────────────────────────────────────────────┐
│ Request that the user provide at least one of a key         │
│ document, a date, a name, a key term, a sample document,    │
│ and a tag, where the tag includes at least one of an issue, │
│ a folder, a production, and a work product  1108            │
└─────────────────────────────────────────────────────────────┘
                              │
                              ▼
┌─────────────────────────────────────────────────────────────┐
│ Classify the second set of documents based on the map of    │
│ terms and words and the at least one of the key document,   │
│ the date, the name, the key term, the sample document,      │
│ and the tag  1110                                           │
└─────────────────────────────────────────────────────────────┘
                              │
                              ▼
┌─────────────────────────────────────────────────────────────┐
│ Provide the user with documents of interest based on        │
│ classifying the second set of documents and the at least    │
│ one of the key document, the date, the name, the key term,  │
│ the sample document, and the tag  1112                      │
└─────────────────────────────────────────────────────────────┘
```

FIG 11

TECHNOLOGY PLATFORM FOR DATA DISCOVERY

CROSS-REFERENCE TO RELATED APPLICATIONS

The present application is a continuation of U.S. patent application Ser. No. 15/432,017, filed Feb. 14, 2017 and titled TECHNOLOGY PLATFORM FOR DATA DISCOVERY, the contents of which are incorporated herein by reference in their entirety.

BACKGROUND

Document searches are used in a variety of applications. For example, document searches are typically used in legal discovery during a lawsuit. During legal discovery, a user may need to search documents, read the documents, and then identify those documents that contain particular text that would be useful in a lawsuit. Such a discovery process can be time consuming due to potentially thousands of documents that need to be searched, reviewed, and identified.

SUMMARY

Embodiments generally relate to a computer-implemented method to organize data discovery documents. The method includes receiving a set of documents related to data discovery issues, wherein at least a first data discovery issue is unrelated to a second data discovery issue. The method further includes generating a map of terms and words for the set of documents that correspond to concepts. The method further includes providing a user interface that includes a search analytics tool to a user associated with the first data discovery issue.

In some embodiments, the search analytics tool includes a word cloud option and the method further comprises generating a word cloud that categorizes the terms and the words in first documents of the set of documents that correspond to the first data discovery issue based on a prevalence of each of the terms and the words in the first documents and providing the user with an option to search for a subset of the first documents that include a first word from the word cloud. In some embodiments, the method further comprises receiving a selection of the first word in the world cloud and providing the user with a visual representation of different meanings for the first word, connections between the different meanings, and one or more synonyms that correspond to each of the different meanings. In some embodiments, the method further comprises receiving a selection of the first word in the world cloud and providing the user with a tree view of different meanings for the first word and one or more synonyms that correspond to each of the different meanings. In some embodiments, the search analytics tool includes a semantics search and the method further comprises generating a word cloud that categorizes the terms and the words in first documents of the set of documents that correspond to the first data discovery issue based on a prevalence of each of the terms and words in the first documents and providing the user with an option to search for a first word that is semantically similar to a second word in the word cloud. In some embodiments, the search analytics tool includes a search option and further comprising receiving a request from the user for first documents of the set of documents that match a search term and providing the user with search results where the first documents are provided in a synopsis view that includes a name, a link, a date, and a category for one or more of the first documents. In some embodiments, first documents of the set of documents are associated with a tag and the search analytics tool includes a tag summary that includes a first number of the first documents, a total document size of the first documents, a last modification date associated with the first documents, and a second number of second documents that are similar to the first documents.

In some embodiments, a method comprises receiving a first set of documents related to data discovery issues, wherein the first set of documents is associated with a first data discovery issue, generating a map of terms and words for the first set of documents that correspond to concepts, receiving, from a user, a second set of documents that is associated with a second data discovery issue, wherein the first data discovery issue is unrelated to the second data discovery issue, requesting that the user provide at least one of a key document, a date, a name, a key term, a sample document, and a tag, wherein the tag includes at least one of an issue, a folder, a production, and a work product, classifying the second set of documents based on the map of terms and words and the at least one of the key document, the date, the name, the key term, the sample document, and the tag, and providing the user with documents of interest based on classifying the second set of documents and the at least one of the key document, the date, the name, the key term, the sample document, and the tag.

In some embodiments, the method further comprises determining a type of user associated with the user and identifying the documents of interest based on the type of user. In some embodiments, the type of user includes a decision maker and a reviewer. In some embodiments, identifying the documents of interest is further based on a type of issue associated with the second set of documents. In some embodiments, classifying the second set of documents is further based on at least one of a date, a name, and a key term. In some embodiments, the names include law firms and people. In some embodiments, the method further comprises classifying names in the first set of documents by associating each name with a classified term, wherein two or more names are associated with a same classified term.

BRIEF DESCRIPTION OF THE DRAWINGS

The disclosure is illustrated by way of example, and not by way of limitation in the figures of the accompanying drawings in which like reference numerals are used to refer to similar elements.

FIG. 7 illustrates an example user interface that displays a search result summary based on a search of the data discovery documents.

FIG. 8 illustrates an example user interface that displays a subset of documents from the search results that match a search term.

FIG. 9 illustrates an example user interface that displays a synopsis view of a particular search result.

FIG. 10 illustrates a flowchart of an example method to organize data discovery documents.

FIG. 11 illustrates a flowchart of another example method to organize data discovery documents.

DETAILED DESCRIPTION

Example System

Figure 1:
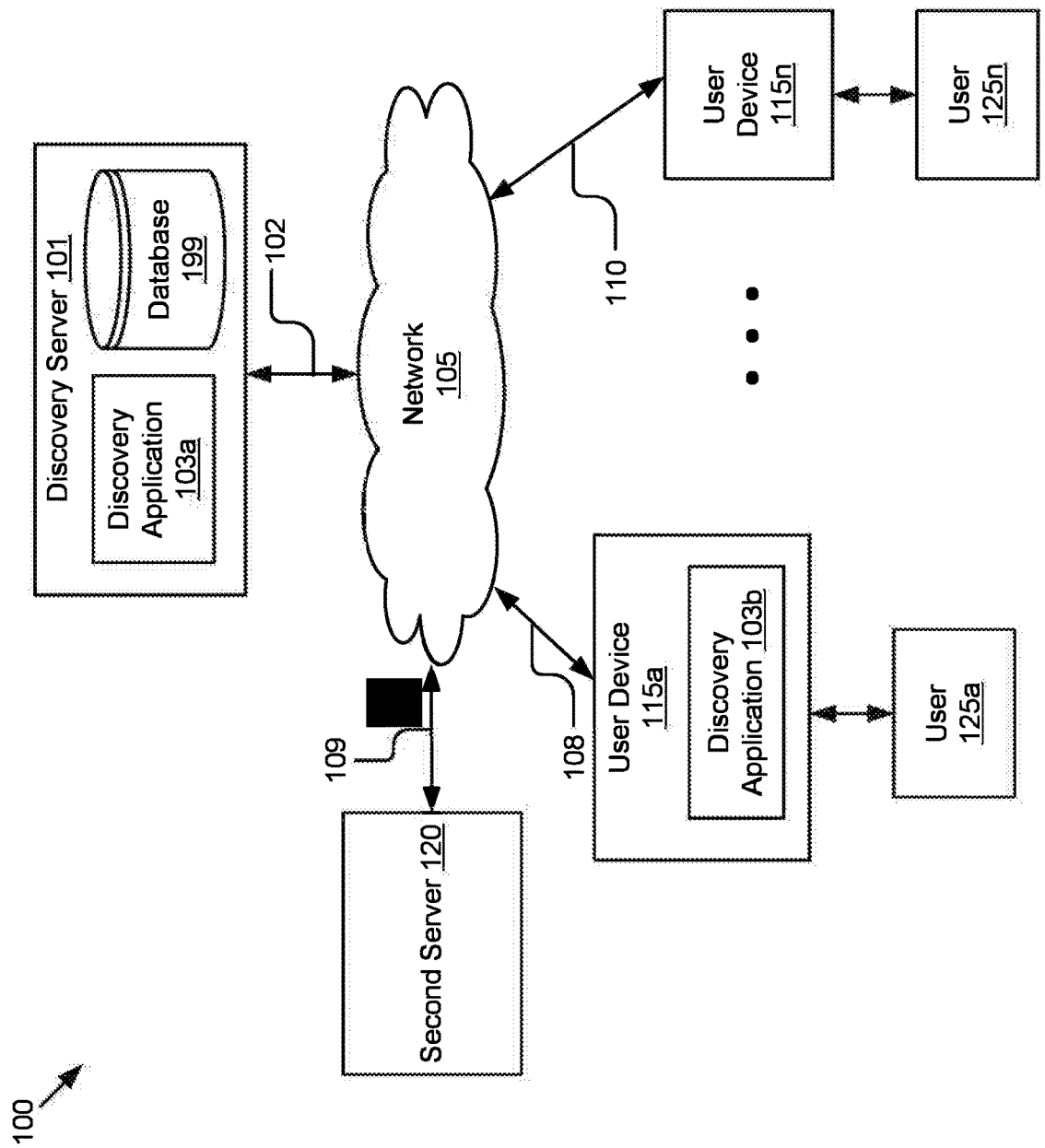
FIG. 1 illustrates a block diagram of an example system that organizes data discovery documents.

FIG. 1 illustrates a block diagram of an example system 100 that organizes data discovery documents. The illustrated system 100 includes a discovery server 101, user devices 115a, 115n, a second server 120, and a network 105. Users 125a, 125n may be associated with respective user devices 115a, 115n. In some embodiments, the system 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The discovery server 101 may include a processor, a memory, and network communication capabilities. In some embodiments, the discovery server 101 is a hardware server. The discovery server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the discovery server 101 sends and receives data to and from one or more of the user devices 115a, 115n and the second server 120 via the network 105. The discovery server 101 may include a discovery application 103a and a database 199.

The discovery application 103a may be code and routines operable to organize data discovery documents. In some embodiments, the discovery application 103a may be implemented using hardware including a field-programmable gate array (FPGA) or an application-specific integrated circuit (ASIC). In some embodiments, the discovery application 103a may be implemented using a combination of hardware and software. The database 199 may store data discovery documents, tags, user profiles, etc.

The user device 115 may be a computing device that includes a memory and a hardware processor. For example, the user device may include a desktop computer, a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. Signal lines 108 and 110 may be a wired connection, such as Ethernet, coaxial cable, fiber-optic cable, etc., or a wireless connection, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some embodiments, discovery application 103b may be stored on a user device 115a. The discovery application 103 may include a thin-client discovery application 103b stored on the user device 115a and a discovery application 103a that is stored on the discovery server 101. For example, the discovery application 103b stored on the user device 115a may display a user interface that includes information about the data discovery documents. A user may be able to interact with the user interface to provide user input, for example, by uploading additional data discovery documents, providing the discovery application 103b with a name of a person involved in a lawsuit, tag data discovery documents as privileged, etc. The user device 115a may transmit the user input to the discovery application 103a stored on the discovery server 101. The discovery application 103a stored on the discovery server 101 may receive the user input and further organize the data discovery documents based on the user input. For example, responsive to the user uploading the additional data discovery documents, the discovery application 103a may recategorize the data discovery documents based on the additional data discovery documents.

The second server 120 may include a processor, a memory, and network communication capabilities. The second server 120 may access the network 105 via signal line 109. The second server 120 may include an application that provides a service. For example, the second server 120 may include an electronic encyclopedia, dictionary, thesaurus, etc. The second server 120 may receive a request from the discovery application 103 for additional information from the discovery application, such as information about concepts that are similar to the term "market." The second server 120 may provide the requested information to the discovery application.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth® communication networks, WiFi®, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the user devices 115 and the discovery server 101, in practice one or more networks 105 may be coupled to these entities.

Example Computing Device

Figure 2:
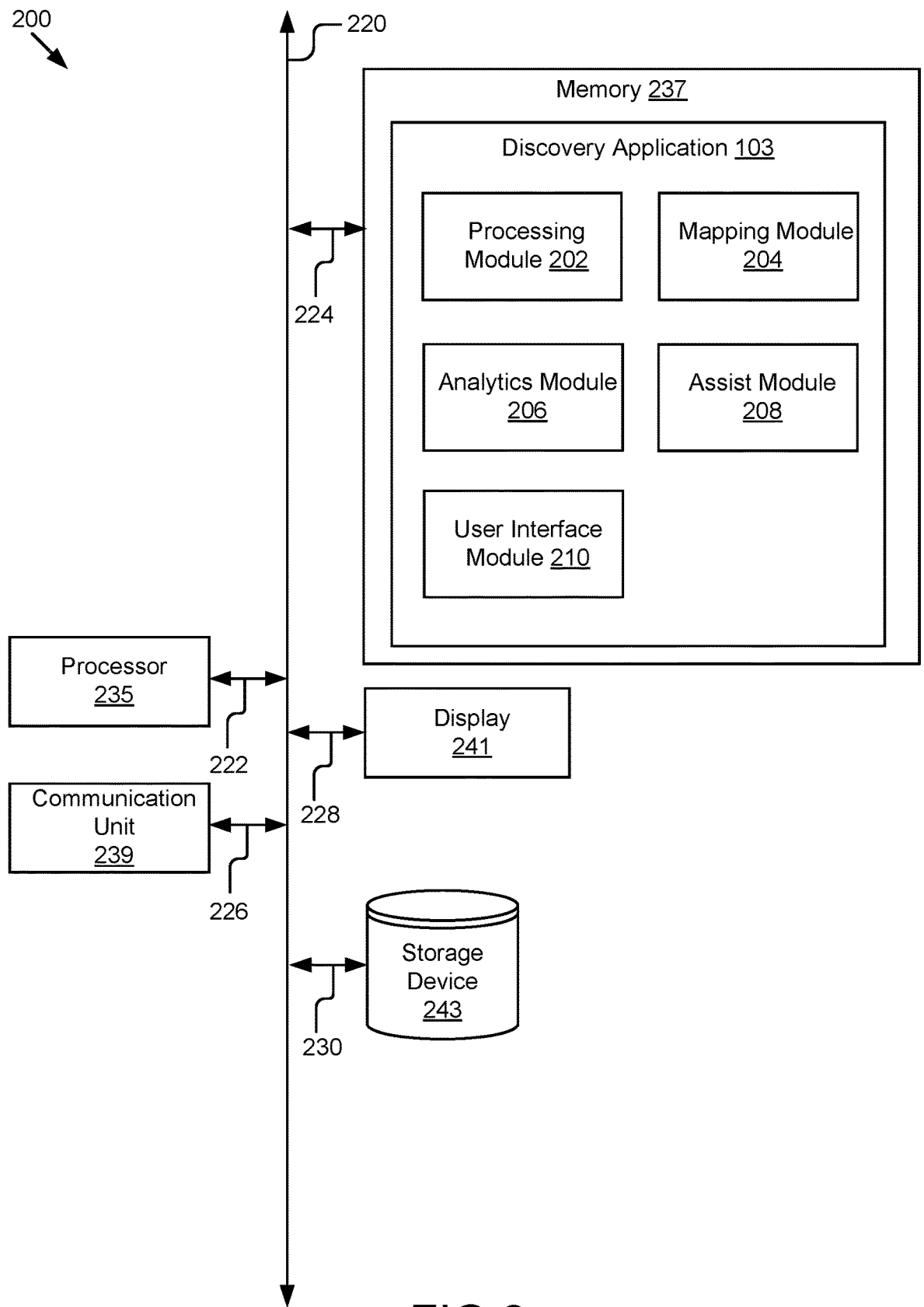
FIG. 2 illustrates a block diagram of an example computing device that organizes data discovery documents.

FIG. 2 illustrates a block diagram of an example computing device 200 that organizes data discovery documents. The computing device 200 may be a discovery server 101 or a user device 115. The computing device 200 may include a processor 235, a memory 237, a communication unit 239, a display 241, and a storage device 243. Additional components may be present or some of the previous components may be omitted depending on the type of computing device 200. For example, if the computing device 200 is the discovery server 101, the computing device 200 may not include the display 241. A discovery application 103 may be stored in the memory 237. In some embodiments, the computing device 200 may include other components not listed here, such as a battery, etc. The components of the computing device 200 may be communicatively coupled by a bus 220.

The processor 235 includes an arithmetic logic unit, a microprocessor, a general purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some embodiments, the memory 237 also includes a non-volatile memory, such as a (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the discovery application 103, which is described in greater detail below. The memory 237 is coupled to the bus 220 for communication with the other components via signal line 224.

The communication unit 239 transmits and receives data to and from at least one of the user device 115 and the discovery server 101 depending upon where the discovery application 103 may be stored. In some embodiments, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the user device 115 or the discovery server 101, depending on where the discovery application 103 may be stored. In some embodiments, the communication unit 239 includes a wireless transceiver for exchanging data with the user device 115, discovery server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some embodiments, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some embodiments, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The display 241 may include hardware operable to display graphical data received from the discovery application 103. For example, the display 241 may render graphics to display an overlay and a resulting composite image. The display 241 is coupled to the bus 220 for communication with the other components via signal line 228.

The storage device 243 may be a non-transitory computer-readable storage medium that stores data that provides the functionality described herein. In embodiments where the computing device 200 is the discovery server 101, the storage device 243 may include the database 199 in FIG. 1. The storage device 243 may be a DRAM device, a SRAM device, flash memory or some other memory device. In some embodiments, the storage device 243 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The storage device 243 is coupled to the bus 220 for communication with the other components via signal line 230.

The discovery application 103 may include a processing module 202, a mapping module 204, an analytics module 206, an assist module 208, and a user interface module 210.

The processing module 202 processes data discovery documents. In some embodiments, the processing module 202 includes a set of instructions executable by the processor 235 to process the data discovery documents. In some embodiments, the processing module 202 is stored in the memory 237 of the computing device 200 and can be accessible and executable by the processor 235.

The processing module 202 may receive a set of documents related to data discovery issues. For example, the data discovery issues may relate to compliance, backup data, organizational data, electronic discovery issues, etc. Electronic discovery issues are associated with discovery in a legal proceeding, such as a litigation, a government investigation, a Freedom of Information Act request, etc. The set of documents may include forwarded emails, attached documents, a filed pleading, etc. For example, the set of documents may be associated with a lawsuit that includes both a contracts cause of action and a tort cause of action. The processing module 202 may receive the set of documents from a single user, such as a project manager, or from multiple users.

The processing module 202 processes the set of documents. The processing module 202 may identify metadata associated with the set of documents. For example, the processing module 202 may identify a type of document, a date of creation of the document, dates that the document was modified, an identify of any user that modified the document, etc.

In some embodiments, the processing module 202 identifies information within the set of documents that is relevant for the data discovery process. For example, the processing module 202 may identify the following information from the set of documents: names of people, dates of events, content-rich documents, near-duplicate pivot documents, a starting point for a network of communications, privilege communication parties, and key terms. The processing module 202 may identify the names of people and a category associated with the name of people. For example, the processing module 202 may identify a type of user as a key custodian, an attorney, general counsel, a name of a law firm, etc. The processing module 202 may identify the communication parties by, for example, identifying the names of outside counsel. The processing module 202 may identify key terms in the set of documents, such as key terms that might be associated with a cause of action, a date that is significant for a particular lawsuit, an activity that could indicate guilt or liability, etc. The processing module 202 may index the set of documents based on the metadata and/or other information identified in the set of documents, such as the key terms.

In some embodiments, the processing module 202 may request the user or users to provide additional information about the set of documents. For example, the processing module 202 may instruct the user interface module 210 to provide a user interface that requests a user to input or identify a key document in the set of documents, a date associated with the set of documents, a name associated with the set of documents, a key term associated with the set of documents, a sample document, and/or a tag. The key document may include, for example, an email that triggered a lawsuit. In some embodiments, because the key document may not be part of the system, the user interface includes an option for uploading the key document and/or a text field where the user could copy and paste the text from the key document. The date may include a single date (e.g., one day, one week, one month), a range of dates (e.g., a beginning and ending date), and an identification of the significance of the date (e.g., the date is associated with a date that a contract was signed). The name may also be associated with a type of person, such as a person that is potentially privileged, a key person (e.g., in a lawsuit), a person's role in a company, a location of the person, etc. In some embodiments, the tag describes an issue (e.g., a cause of action associated with the set of documents), a folder, production, and/or work product. The analytics module 206 may use the tag provided by the user in association with a document to find other documents that are near duplicates of the tagged documents. The analytics module 206 may also use the tag as part of a training set to categorize the set of documents based on the tag. The additional information may be used by the assist module 208 to provide suggestions to the user, such as next steps for categorizing data discovery documents.

In some embodiments, the set of documents includes all documents processed by the discovery application 103. The set of documents may be related to multiple data discovery issues where a first data discovery issue is unrelated to a second data discovery issue. For example, the first data discovery issue may be a patent lawsuit and the second data discovery issue may be a breach of a covenant not to compete lawsuit. The mapping module 204 as described in greater detail below may use the set of documents to create a unified knowledge database while maintaining separation between the unrelated issues in the set of documents to maintain confidentiality.

In some embodiments, the processing module 202 may receive updated documents related to a data discovery issue. For example, the data discovery issue may be initiated by a cease and desist letter, but later a complaint and pleadings may be available. The processing module 202 processes the updated documents.

The mapping module 204 generates a map of terms and words in the set of documents that correspond to concepts. In some embodiments, the mapping module 204 includes a set of instructions executable by the processor 235 to generate the map of terms and words. In some embodiments, the mapping module 204 is stored in the memory 237 of the computing device 200 and can be accessible and executable by the processor 235.

In some embodiments, the mapping module 204 generates a unified knowledge database that automatically classifies data across the set of documents. For a law firm the mapping module 204 may classify all instantiations of the law firm name as being associated with the classified term. For example, for a law firm named Smith, Hugh, and Reynolds, the mapping module 204 may associate references to Smith, Hugh; Smith, Hugh, and Reynolds; SH&R, etc. to the law firm Smith, Hugh, and Reynolds. For images, the mapping module 204 may classify people and objects in the images the same so that one image is not classified as including a car when another image is classified as including a vehicle. Instead, the mapping module 204 applies uniformity across the set of documents.

The mapping module 204 uses the unified knowledge database to generate a map of terms and words for various concepts that applies across the set of documents. For example, the mapping module 204 categorizes relationships between concepts based on the association of terms and words in the unified knowledge database. The map may be helpful to users to help guide the users in identifying new search terms for organizing the electronic documents.

In some embodiments, the mapping module 204 uses the information received by the processing module 202 from the user and the map of terms and words to identify documents of interest within a set of documents associated with a data discovery issue that may be of interest to a user. The processing module 202 may receive a key document, a date, a name, a key term, a sample document, and/or a tag associated with a set of documents. The mapping module 204 may identify documents of interest that include key dates, documents that include key names, documents that include key terms, and/or key documents within the set of documents. In some embodiments, the mapping module 204 may identify the documents of interest based on a type of issue associated with the set of documents. For example, the mapping module 204 may identify different documents of interest when the data discovery issue is a contracts case vs. a criminal investigation.

For example, the mapping module 204 may use a first set of documents that includes all data discovery documents to generate the map of terms and words. The processing module 202 may receive a second set of documents related to a data discovery issue and an identification of "market" from a user as a key term for the second set of documents. The mapping module 204 may use the map of terms and words to identify terms that are similar to market, such as business, commerce, and trade. The mapping module 204 may then identify documents of interest from the set of documents that reference market, business, commerce, or trade.

In some embodiments, the mapping module 204 identifies determines a type of user and identifies the documents of interest based on the type of user. For example, the type of user may include a decision maker and a reviewer. A decision maker may provide inputs and interactively train the discovery application 103 to obtain the desired results. For example, mapping module 204 may include artificial intelligence and/or machine learning that uses a training set to generate the map of terms and words and to identify documents of interest. The decision maker may provide the training set and make modifications to train the artificial intelligence and/or the machine learning to achieve the desired results. The reviewer may be a basic user that is able to tag documents, but whose main job is to be presented with similar documents that they can tag or to modify documents tagged by another user.

The mapping module 204 may instruct the user interface module 210 to generate an email or other type of notification for the user to provide the user with the documents of interest and a number of documents associated with different parameters. For example, the user interface module 201 may generate an email for the user that states "We have identified some documents that might be of interest to you. Documents that correlate to: key dates (47 documents); key names (300 documents); key terms (257 documents); key documents (89 documents)."

The analytics module 206 analyzes a set of documents. In some embodiments, the analytics module 206 includes a set of instructions executable by the processor 235 to analyze the set of documents. In some embodiments, the analytics module 206 is stored in the memory 237 of the computing device 200 and can be accessible and executable by the processor 235.

The analytics module 206 instructs the user interface module 210 to provide a user interface with a search analytics tool that includes different options for visually organizing concepts within a set of documents that are associated with a data discovery issue. In some embodiments, the analytics module 206 organizes the set of documents based on core principles, such as a type of custodian (i.e., different people who are responsible for managing the electronic documents), file type, file extension, file content, document type, file size, or file hash (i.e., a unique identifier associated with a document). The analytics module 206 may organize the set of documents corresponding to electronic documents based on an author or a file name. The analytics module 206 may organize a set of documents corresponding to email based on the sender, a sender domain, a receiver, a receiver domain, a subject, or an email item type. In some embodiments, the analytics module 206 automatically organizes the set of documents based on different features associated with the set of documents, such as topics, topic terms, location, organization, a person, a summary, or a language.

The analytics module 206 may instruct the user interface module 210 to generate a user interface that displays a prevalence of different words and terms in different formats. For example, the user interface module 210 may generate a user interface that includes a word cloud that categorizes terms and words in a set of documents based on a prevalence of each of the terms and the words in the set of documents. The analytics module 206 may instruct the user interface module 210 to include an option to search for a subset of the set of documents that include a word from the word cloud. The analytics module 206 may instruct the user interface module 210 to include an option to search for a word that is semantically similar to another word in the word cloud.

In another example, the user interface module 210 may generate a user interface that includes word bubbles that display the terms and words based on a prevalence of the terms and words in a set of documents. Other examples may include a user interface that includes words with semantic similarity to a selected term, a user interface that organizes metadata associated with the set of documents, a user interface that organizes work product associated with the set of documents, a user interface that displays clustered topics associated with the set of documents, etc.

In some embodiments, the user interface module 210 may provide a user with the option of generating the word cloud or the word bubble for a subset of the set of documents, such as a subset of documents that were created during a particular date range, a subset of documents that also include another word or that are associated with a particular tag, a subset of documents that were created by a particular user or came from email addresses that are associated with a particular domain name, etc. In some embodiments, clicking on a word or term within the user interface causes the analytics module 206 to retrieve a subset of documents within the set of documents that include the selected word or term.

Figure 3:
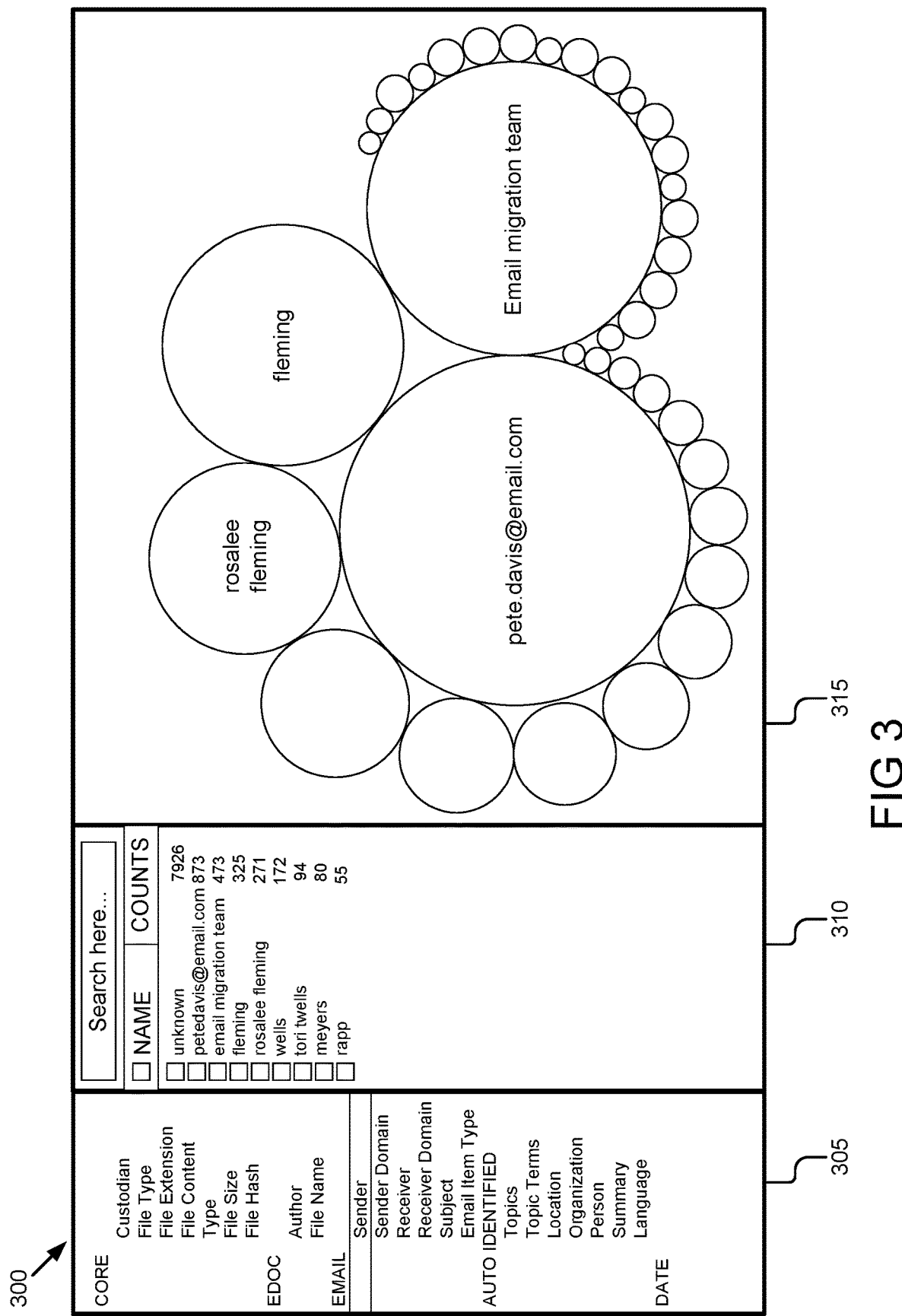
FIG. 3 illustrates an example user interface that displays word bubbles that indicate the prevalence of different concepts based on the data discovery documents.

Turning to FIG. 3, an example user interface 300 is illustrated that displays word bubbles that indicate the prevalence of different concepts based on data discovery documents. The user interface 300 provides a first panel 305 for organizing the set of documents, a second panel 310 that details a top number of results for a selected category, and a third panel 315 that includes a visual categorization of the results for the selected category. A user select any subsection under a category to view data discovery documents associated with the selected category. For example, where the category is "core," a user may view data discovery documents based on custodian, file type, file extension, file content, type, file size, and file hash. Where the category is "electronic document," a user may view data discovery documents based on author or file name. Where the category is "email," the user may view data discovery documents based on sender, sender domain, receiver, receiver domain, subject, or email item type. Where the category is "automatically identified," the user may view data discovery documents based on topics, topic terms, location, organization, person, summary, or language. Where the category is "date," the user may view data discovery documents based on a date.

In this example, a user requested a word bubble that illustrates emails from a set of documents that are organized based on a sender. The emails are associated with a top nine senders. The senders are represented with word bubbles that are sized based on the prevalence of emails from those particular senders. In this example, although the bulk of the emails are from an unknown sender, the unknown sender is not part of the word bubbles since "unknown" is an unhelpful category.

Clicking on one of the boxes to the left of the results in the second panel 310 causes the analytics module 206 to retrieve the corresponding results. For example, clicking on the box to the left of "rapp" causes the analytics module 206 to instruct the user interface module 210 to display the 55 emails from the set of documents that were sent by "rapp."

In some embodiments, the analytics module 206 uses the map of terms and words to organize data for the user and provide options for other search terms to use to organize the set of documents. For example, where the word cloud or the word bubble displays key terms, selection of one of the key terms may cause the analytics module 206 to instruct the user interface module 210 to display related concepts, information about related concepts, synonyms of a selected word, etc.

In some embodiments, responsive to a user selecting a word from the word cloud or a word bubble, the analytics module 206 instructs the user interface module 210 to provide a user with a visual representation of different meanings for a selected word, connections between the different meanings, and one or more synonyms that correspond to each of the different meanings.

Figure 4:
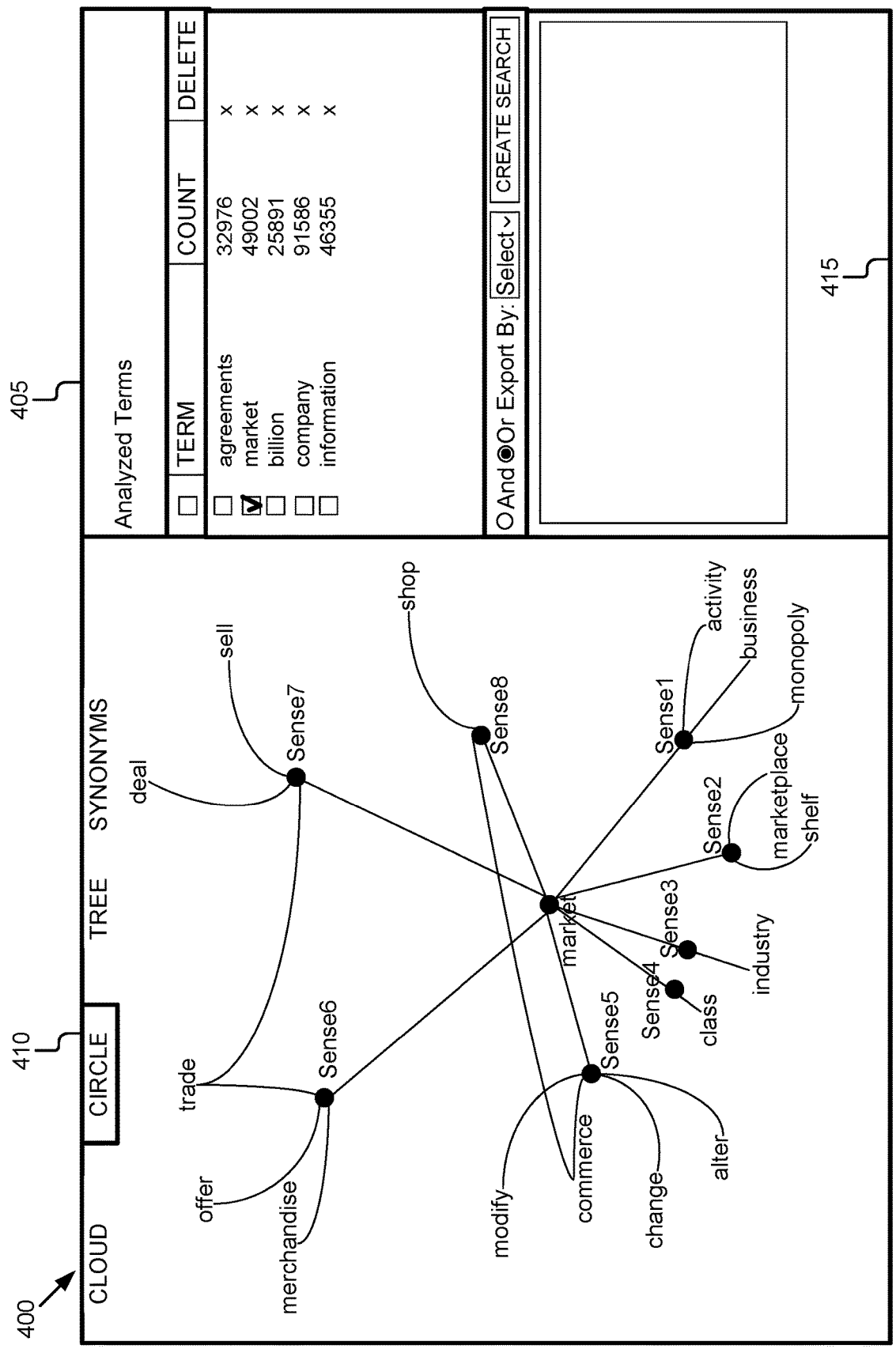
FIG. 4 illustrates an example user interface that displays a web of related concepts based on the data discovery documents.

FIG. 4 illustrates an example user interface 400 that displays a web of related concepts based on the data discovery documents. In this example, a user interface module 210 displays a user interface 400 with an analyzed term panel 405 that includes the top key terms. The "market" term is selected and the analytics module 206 instructs the user interface module 210 to display concepts that are related to "market." For the circle tab 410 the analytics module 206 organizes the related concepts according to senses. The senses are further divided according to related concepts. The user interface 400 further includes a search panel 415 where a user may specify search terms for searching the set of documents.

In another embodiment, responsive to a user selecting a word from the word cloud or a word bubble, the analytics module 206 instructs the user interface module 210 to provide a user with a tree view of the different meanings for the first word and one or more synonyms that correspond to teach of the different meanings.

Figure 5:
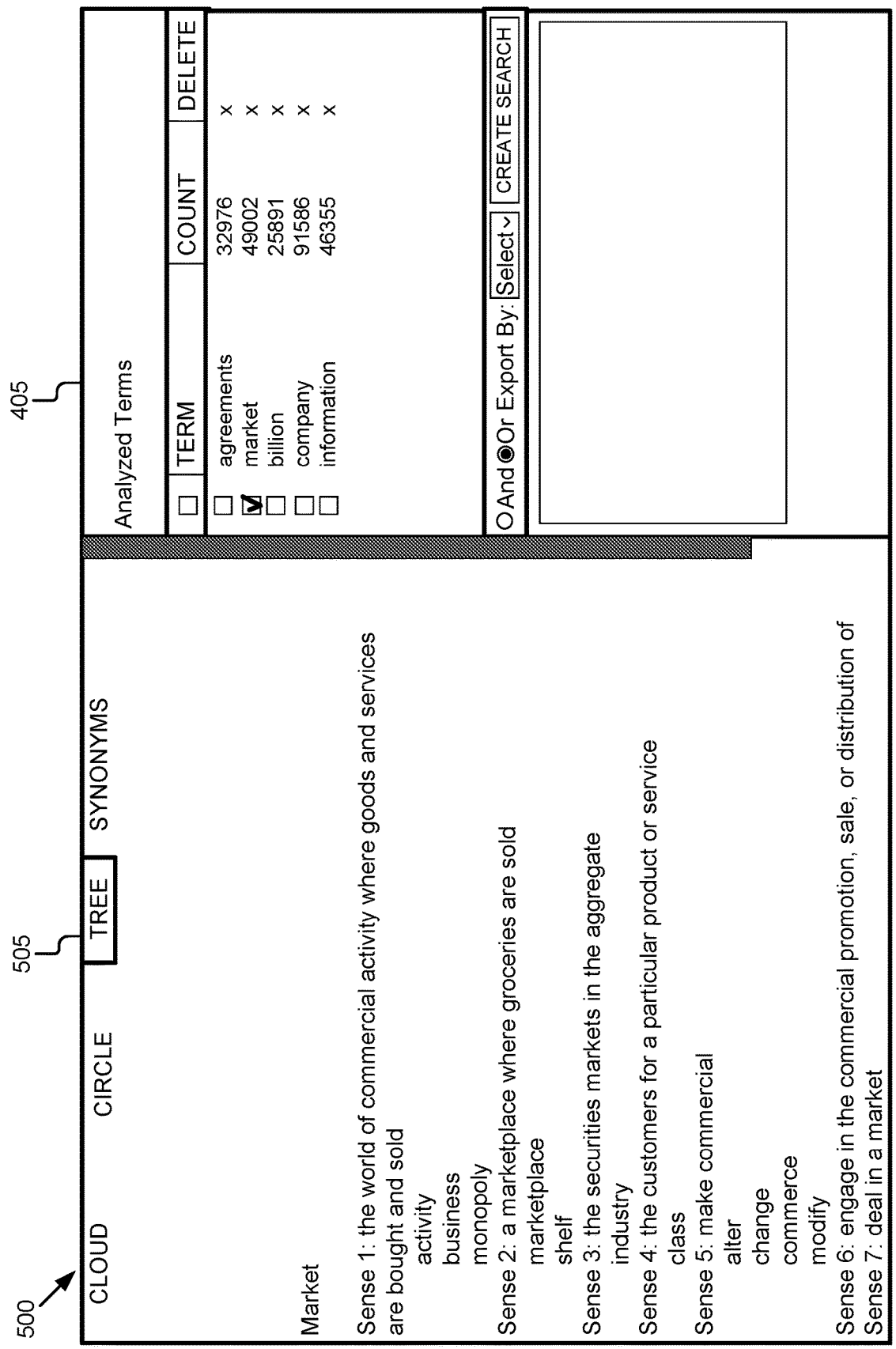
FIG. 5 illustrates an example user interface that displays definitions of related concepts based on the data discovery documents.

FIG. 5 illustrates an example user interface 500 that displays definitions of related concepts based on the data discovery documents. In this example, the senses that were identified in FIG. 4 for the circle tab are defined in the tree tab 505. Under at least some of the senses are synonyms of the selected concept. For example, sense 1 is defined as the world of commercial activity where goods and services are bought and sold and the synonyms of market that correspond to sense 1 are activity, business, and monopoly.

The assist module 208 performs searches of the data discovery documents. In some embodiments, the assist module 208 includes a set of instructions executable by the processor 235 to perform searches. In some embodiments, the assist module 208 is stored in the memory 237 of the computing device 200 and can be accessible and executable by the processor 235. In some embodiments, the actions performed by the assist module 208 are actions associated with a service called "CaseAssist." For example, the user interfaces illustrated in FIGS. 6-9 are based on actions performed by the assist module 208 that are provided to a user as part of a CaseAssist service.

The assist module 208 receives information from the processing module 202 and/or the memory 237 about a set of documents associated with a data discovery issue. For example, the set of documents are associated with a particular legal investigation. The assist module 208 instructs the user interface module 210 to provide a user interface for the user to provide parameters for searching the set of documents. The parameters include a session name, a role of users associated with the set of documents (e.g., case administrator, client administrator, client reviewer, etc.), people associated with the set of documents (e.g., people that are potential parties to a lawsuit), dates associated with the set of documents, keywords, a similar document search, and work product (e.g., tags associated with the set of documents). The assist module 208 uses the information identified by the processing module 202 as being associated with the data discovery issue to make suggestions for search terms for the parameters. For example, the processing module 202 identifies people, key terms, and dates that are associated with the data discovery issue. The processing module 202 instructs the user interface module 210 to provide the identified people, key terms, and dates as suggested parameters for a search, for example, by providing a drop-down box with the people, key terms, and dates; by providing a suggestion that corresponds to a person, a key term, or a date responsive to a user entering a letter in a text field; etc.

Figure 6:
FIG. 6 illustrates an example user interface that that includes parameters for performing a search of the set of documents associated with a data discovery issue.

Turning to FIG. 6, an example user interface 600 is illustrated that includes parameters for performing a search of the set of documents associated with a data discovery issue. For example, FIG. 6 illustrates a user interface 600 for creating a CaseAssist session for searching the set of documents.

The user interface 600 includes an option for specifying that the search is a new session or an existing session. If the session is an existing session, the assist module 208 stores the existing session in association with a session name. If a user makes changes to an existing session, the assist module 208 may save the changes for the existing session. In this example, the session is an existing session. A user may identify a list of existing sessions by selecting the drop-down box 605 for existing session names.

The user interface 600 includes an option for selecting the role of people associated with the data discovery issue. Because different types of people may have access to different subsets of documents within the set of documents, a user may want to search subsets of documents associated with the different types of people. In this example, a user specified using the drop-down box 610 that the search should include the subsets of documents associated with the case administrator, the client administrator, and the client reviewer.

The user interface 600 includes an option for requesting documents that are associated with particular people. In this example, the user interface includes a text field 615 where a user may specify the name of a person and add the person by selecting the add icon 617. The assist module 208 may suggest people to add to the search. For example, continuing with the example described in FIG. 3 where the top sender for the emails is Pete Davis, the user interface module 210 may display an option to add Pete Davis as a person to be searched. Alternatively, if the user adds the letter "P" within the text field 615, the user interface module 210 may populate the rest of the text field 615 with "Pete Davis" as a suggestion.

Once a user selects the add icon 617 to add the person to the search, the user interface module 210 creates an icon for the added person. For example, responsive to the user adding "Pete Davis" to the search, the user interface module 210 adds a Pete Davis icon 620 to the user interface 600. The user may remove a person from the search by selecting the "X" within the person icon. For example, the user may remove "Pete Davis" from the search by selecting the X within the Pete Davis icon 620.

The user interface 600 includes an option for requesting documents that are associated with particular dates. In this example, the user interface includes a text field 625 where a user may specify a date by adding the date in the format yyyy/mm/dd. The assist module 208 may suggest dates to add to the search. For example, the processing module 202 identified "2001/09/30" as an important date for the data discovery issue.

Once a user selects the add icon 627 to add a date to the search, the user interface module 210 creates an icon for the added date. For example, responsive to the user adding "2001/09/30" to the search, the user interface module 210 adds a 2001/09/30 icon 630 to the user interface 600. The user may remove a date from the search by selecting the "X" within the date icon. For example, the user may remove "2001/09/30" from the search by selecting the X within the 2001/09/30 icon 630.

The user interface 600 includes an option for requesting documents that are associated with keywords. In this example, the user interface includes a text field 635 where a user may specify a keyword and add the keyword by selecting the add icon 637. The assist module 208 may suggest keywords to add to the search. For example, the assist module 208 may suggest keywords based on the key terms identified by the processing module 202 as being important to the data discovery issue.

Once a user selects the add icon 637 to add a keyword to the search, the user interface module 210 creates an icon for the added keyword. For example, responsive to the user adding "never" as a keyword, the user interface module 210 adds a never icon 640 to the user interface 600. The user may remove a keyword from the search by selecting the "X" within the keyword icon. For example, the user may remove "never" from the search by selecting the X within the never icon 640.

The user interface 600 includes an option for specifying that similar documents should be searched. For example, if a user selects the option, the assist module 208 identifies documents from the set of documents that are similar matches based on the search terms. For example, the similar documents may match 90% of the search terms. In some embodiments, the user interface 600 may include an option for specifying a subset of documents to be searched for identifying similar documents within the subset.

The user interface 600 includes an option for specifying work product tags. In this example, the IPAD tag 650 is for a user device associated with a user that provided document review of the set of documents associated with the data discovery issue.

FIG. 7 illustrates an example user interface 700 that displays a search result summary based on a search of the data discovery documents. In some embodiments, responsive to a user requesting a search of the set of documents based on the parameters specified in FIG. 6, the assist module 208 generates a summary of the search results. The search result summary may be a CaseAssist search results summary generated by the assist module 208. In this example, the assist module 208 identified 15201 documents that match the search parameters, 55 gigabytes of data represented by the 15201 documents, a last modification date of Sep. 1, 2005, and 1002 documents that are similar to the search parameters.

FIG. 8 illustrates an example user interface 800 that displays a subset of documents from the search results that match a search term. The search results may be CaseAssist search results generated by the assist module 208. In this example, a user enters "Money" into the text field 805 and the assist module 208 retrieves search results from a set of documents associated with a data discovery issue that include the word "money." The assist module 208 instructs the user interface module 210 to generate a user interface 800 with a first panel 810 that categorizes the set of documents based on a type of document. In this example, the user interface 800 includes the emails associated with different senders that include emails with the word "money." To the right of each type of sender is a number of search results that correspond to the word "money."

The user interface 800 includes a second panel 815 that includes a preview of the matching documents. Each search result is illustrated with an image of the search result, a unique identifier for the search result, a type of search result, sample text from the search result with the matching search term, and a date that the search result was created. For example, the first search result includes a preview 820 of the first page of the PowerPoint, the unique identifier for the search result is REV0000043, the sample text from the search result includes the word "money", and the search result was created on Feb. 4, 2002. In some embodiments, the user interface module 210 generates a popup when a user's pointing device hovers over one of the search results. The popup may include relevant topics, classes of documents, similar documents, etc.

FIG. 9 illustrates an example user interface 900 that displays a synopsis view of a particular search result. The search result may be CaseAssist quick review generated by the assist module 208. The user interface module 210 generates a user interface 900 with a quick view for a data discovery document. For example, the user interface module 210 generates the quick view responsive to a user selecting the search result from the search results illustrated in FIG. 8. The quick view includes a name of the search result, a link to the search result, a date (e.g., a date of creation, a date of the last modification, etc.), a list of categories generated by the processing module 202 (e.g., finance, business, etc.), a document summary generated by the assist module 208, case tags that were provided by people that reviewed the document or that were automatically generated by the processing module 202, and assist tags that were provided by people that reviewed the document or that were automatically generated by the processing module 202.

In some embodiments, the assist module 208 analyzes user actions and provides additional information related to the user actions. In a first example, the assist module 208 identifies a threshold number of times that a user searches for documents that correspond to a particular search term. If the user inputs the search term more than the threshold number of times, the assist module 208 may identify documents that are similar to the matching results, such as documents that are associated with a related search term, are 90% similar to the matching documents, etc. In a second example, the assist module 208 may track an amount of time that a user spends reviewing documents in a set of documents associated with a data discovery issue. The assist module 208 may determine an average amount of time that the user spends reviewing documents. If the user exceeds the review time for a document by a threshold amount of time, the assist module may identify similar documents and provide them to the user. In a third example, the assist module 208 may instruct the user interface module 210 to generate a user interface with an option to take documents with an assist tag. If the user tags a document with the assist tag, the assist module 208 may identify documents that are similar to the tagged document and provide the similar documents to the user.

The user interface module 210 generates user interfaces. In some embodiments, the user interface module 210 includes a set of instructions executable by the processor 235 to generate the user interface. In some embodiments, the user interface module 210 is stored in the memory 237 of the computing device 200 and can be accessible and executable by the processor 235.

In some embodiments, the user interface module 210 receives instructions from the processing module 202, the mapping module 204, the analytics module 206, and/or the assist module 208.

Example Methods

FIG. 10 illustrates a flowchart of an example method 1000 to organize data discovery documents. The method 1000 is performed by a discovery application 103 stored on a computing device 200, such as a user device 115, a discovery server 101, or in part a user device 115 and in part a discovery server 101.

At block 1002, a set of documents related to data discovery issues is received, where at least a first data discovery issue is unrelated to a second data discovery issue. For example, the set of documents includes all data discovery documents processed by the discovery application 103. A first set of documents may be associated with the first data discovery issue and a second set of documents may be associated with the second data discovery issue.

At block 1004, a map of terms and words for the set of documents is generated that correspond to concepts. At block 1006, a user interface that includes a search analytics tool is provided to a user associated with the first data discovery issue. The user may be, for example, a custodian that tags different data discovery documents that are part of the first set of documents. The search analytics tool may provide information based on the map of terms and words.

FIG. 11 illustrates a flowchart of another example method 1100 to organize data discovery documents. The method 1100 is performed by a discovery application 103 stored on a computing device 200, such as a user device 115, a discovery server 101, or in part a user device 115 and in part a discovery server 101.

At block 1102, a first set of documents related to data discovery issues is received, where the first set of documents is associated with a first data discovery issue. For example, the first data discovery issue may be a civil litigation involving a torts cause of action and a breach of contract cause of action. At block 1104, a map of terms and words for the first set of documents that correspond to concepts is generated.

At block 1106, a second set of documents that is associated with a second data discovery issue is received from a user, where the first data discovery issue is unrelated to the second data discovery issue. At block 1108, it is requested that the user provide at least one of a key document, a date, a name, a key term, a sample document, and a tag, where the tag includes at least one of an issue, a folder, a production, and a work product.

At block 1110, the second set of documents is classified based on the map of terms and words and the at least one of the key document the date, the name, the key term, the sample document, and the tag. At block 1112, the user is provided with documents of interest based on classifying the second set of documents and the at least one of the key document, the date, the name, the key term, the sample document, and the tag.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A method comprising:
receiving a set of documents related to data discovery issues, wherein a first data discovery issue of the data discovery issues is unrelated to a second data discovery issue of the data discovery issues;
generating, based on a unified knowledge database, a map of terms and words for the set of documents that correspond to concepts by classifying different instantiations of one or more related terms in the set of documents as being associated with a same classified term;
identifying, based on the map of terms and words, one or more key terms that are associated with a cause of action of a lawsuit associated with the first data discovery issue or a date that is significant for the lawsuit associated with the first data discovery issue;
receiving a request from a user to view one or more documents of interest;
identifying the documents of interest from the set of documents based on a type of user; and
providing a user interface to the user that includes the documents of interest.

2. The method of claim 1, wherein the type of user is at least one of a key custodian, an attorney, or general counsel.

3. The method of claim 1, wherein the type of user is based at least in part on a name of a law firm that the user is associated with.

4. The method of claim 1, wherein the type of user is a reviewer that tags one or more of the set of documents or a decision maker that provides inputs for using artificial intelligence to improve generating the unified knowledge database or identifying the documents of interest.

5. The method of claim 1, wherein the user interface further includes an option for the user to add one or more key terms to a search of the documents of interest.

6. The method of claim 1, wherein the user interface further includes an option to identify a key document that triggered the first data discovery issue.

7. The method of claim 6, wherein the key document is not part of the set of documents and the user interface further includes at least one of an option to upload the key document or a text field for pasting text from the key document.

8. A non-transitory computer-readable storage medium carrying program instructions thereon, the program instructions when executed by one or more processors cause the one or more processors to perform operations comprising:
receiving a set of documents related to data discovery issues, wherein a first data discovery issue of the data discovery issues is unrelated to a second data discovery issue of the data discovery issues;
generating, based on a unified knowledge database, a map of terms and words for the set of documents that correspond to concepts by classifying different instantiations of one or more related terms in the set of documents as being associated with a same classified term;
identifying, based on the map of terms and words, one or more key terms that are associated with a cause of action of a lawsuit associated with the first data discovery issue or a date that is significant for the lawsuit associated with the first data discovery issue;
receiving a request from a user to view one or more documents of interest;
identifying the documents of interest from the set of documents based on a type of user; and
providing a user interface to the user that includes the documents of interest.

9. The non-transitory computer-readable storage medium of claim 8, wherein the type of user is at least one of a key custodian, an attorney, or general counsel.

10. The non-transitory computer-readable storage medium of claim 8, wherein the type of user is based at least in part on a name of a law firm that the user is associated with.

11. The non-transitory computer-readable storage medium of claim 8, wherein the type of user is a reviewer that tags one or more of the set of documents or a decision maker that provides inputs for using artificial intelligence to improve generating the unified knowledge database or identifying the documents of interest.

12. The non-transitory computer-readable storage medium of claim 8, wherein the user interface further includes an option for the user to add one or more key terms to a search of the documents of interest.

13. The non-transitory computer-readable storage medium of claim 8, wherein the user interface further includes an option to identify a key document that triggered the first data discovery issue.

14. The non-transitory computer-readable storage medium of claim 13, wherein the key document is not part of the set of documents and the user interface further includes at least one of an option to upload the key document or a text field for pasting text from the key document.

15. A system comprising:
one or more processors; and
a memory coupled to the one or more processors, with instructions stored thereon that, when executed by the one or more processors, cause the one or more processors to perform operations comprising:
receiving a set of documents related to data discovery issues, wherein a first data discovery issue of the data discovery issues is unrelated to a second data discovery issue of the data discovery issues;
generating, based on a unified knowledge database, a map of terms and words for the set of documents that correspond to concepts by classifying different instantiations of one or more related terms in the set of documents as being associated with a same classified term;
identifying, based on the map of terms and words, one or more key terms that are associated with a cause of action of a lawsuit associated with the first data discovery issue or a date that is significant for the lawsuit associated with the first data discovery issue;
receiving a request from a user to view one or more documents of interest;
identifying the documents of interest from the set of documents based on a type of user; and
providing a user interface to the user that includes the documents of interest.

16. The system of claim 15, wherein the type of user is at least one of a key custodian, an attorney, or general counsel.

17. The system of claim 15, wherein the type of user is based at least in part on a name of a law firm that the user is associated with.

18. The system of claim 15, wherein the type of user is a reviewer that tags one or more of the set of documents or a decision maker that provides inputs for using artificial intelligence to improve generating the unified knowledge database or identifying the documents of interest.

19. The system of claim 15, wherein the user interface further includes an option for the user to add one or more key terms to a search of the documents of interest.

20. The system of claim 15, wherein the user interface further includes an option to identify a key document that triggered the first data discovery issue.

* * * * *